(12) United States Patent
Tamura

(10) Patent No.: US 8,300,308 B2
(45) Date of Patent: Oct. 30, 2012

(54) EYEPIECE BASE UNIT AND MICROSCOPE

(75) Inventor: Masaaki Tamura, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/761,261

(22) Filed: Apr. 15, 2010

(65) Prior Publication Data

US 2010/0195199 A1 Aug. 5, 2010

Related U.S. Application Data

(63) Continuation of application No. PCT/JP2008/068484, filed on Oct. 10, 2008.

(30) Foreign Application Priority Data

Oct. 15, 2007 (JP) ................ P2007-267353

(51) Int. Cl.
*G02B 21/00* (2006.01)
(52) U.S. Cl. ........................................ 359/381
(58) Field of Classification Search .................. None
See application file for complete search history.

(56) References Cited

U.S. PATENT DOCUMENTS

| 5,138,486 | A | * | 8/1992 | Meyer et al. ................. 359/363 |
| 5,777,783 | A | | 7/1998 | Endou et al. |
| 5,808,791 | A | | 9/1998 | Kawano et al. |
| 6,160,662 | A | * | 12/2000 | Uchida et al. ................ 359/390 |
| 6,323,998 | B1 | | 11/2001 | Kawano et al. |

FOREIGN PATENT DOCUMENTS

| JP | 60-263918 A | 12/1985 |
| JP | 07-035986 A | 2/1995 |
| JP | 08-015612 A | 1/1996 |
| JP | 2004-318181 A | 11/2004 |

* cited by examiner

*Primary Examiner* — Derek S Chapel
(74) *Attorney, Agent, or Firm* — Miles & Stockbridge P.C.

(57) ABSTRACT

An eyepiece base unit and a microscope with which a phase contrast observation function can be easily added to the microscope. The eyepiece base unit is removably attached to a main unit of the microscope, and includes, in a state of being attached to the microscope, a pupil conjugate plane, which is a plane conjugate with an image side focal plane of an objective lens in an observation optical system of the microscope. By rotating a turret around a central axis, phase plates installed in the turret can be inserted into the pupil conjugate plane.

1 Claim, 7 Drawing Sheets

EYEPIECE BASE UNIT AND MICROSCOPE

CROSS-REFERENCE TO RELATED APPLICATION

This application is a continuation of International Application No. PCT/JP2008/068484 filed Oct. 10, 2008.

TECHNICAL FIELD

The present invention relates to an eyepiece base unit and a microscope, and more particularly to an eyepiece base unit and a microscope to which an external phase contrast observation function can be easily added.

BACKGROUND ART

A type of conventional optical microscope is a phase contrast microscope which supports phase contrast observation of a sample, and another so called external phase contrast microscope is known, in which a phase plate used for phase contrast observation is installed on a pupil conjugate plane, that is, a plane conjugate with an image side focal plane of the objective lens (also called "pupil plane" herein below) in order to perform phase contrast observation without dropping the NA of the objective lens. Patent Document 1 discloses that phase plates are installed on a slider that enables the phase plates to be inserted into/removed from the optical path, so that a suitable phase plate is disposed on the optical path according to the observation conditions.
[Patent Document 1] Japanese Examined Patent Publication No. H6-97304

However if a microscope which the user has already purchased is a microscope with which phase contrast observation cannot be performed, the external phase contrast observation cannot be performed without purchasing a new microscope, with which external phase contrast observation can be performed.

DISCLOSURE OF THE INVENTION

With the foregoing in view, it is an object of the present invention to easily add the external phase contrast observation function to a microscope.

An eyepiece base unit, according to a first aspect of the present invention, can be removably attached to a microscope having an eyepiece tube and a main unit, between the eyepiece tube and main unit, with the eyepiece tube being separated from the main unit, and the eyepiece base unit being configured to house phase plates used for phase contrast observation.

A microscope according to a second aspect of the present invention is an inverted microscope that can perform phase contrast observation, comprising: an objective lens; a main unit that includes a portion of an observation optical system of the inverted microscope on a sample side of a pupil conjugate plane, which is a plane conjugate with an image side focal plane of the objective lens; a first eyepiece base unit that houses a phase plate for phase contrast observation and that can be removably attached to the main unit so as to be replaceable with a second eyepiece base unit housing another optical device for performing observation other than phase contrast observation, the first eyepiece base unit in a state of being attached to the main unit being configured to have the pupil conjugate plane, and to be able to insert the phase plate into the pupil conjugate plane; and an eyepiece tube that can be removably attached to the first eyepiece base unit and the second eyepiece base unit.

A microscope according to a third aspect of the present invention is a microscope that can perform phase contrast observation, comprising: a main unit that includes a portion of an observation optical system of the microscope on a sample side of a pupil conjugate plane, which is a plane conjugate with an image side focal plane of an objective lens; an eyepiece base unit that can be removably attached to the main unit, includes the pupil conjugate plane in a state of being attached to the main unit, can insert a phase plate used for phase contrast observation into the pupil conjugate plane, and has adjustment means which adjusts the position of the phase plate in an optical axis direction relative to an optical axis direction of the observation optical system; and a lens barrel unit that can be removably attached to the eyepiece base unit, and includes a portion of the observation optical system on the observation side of the pupil conjugate plane.

According to the present invention, the function of external phase contrast observation function can be easily added to a microscope.

Figure 1:
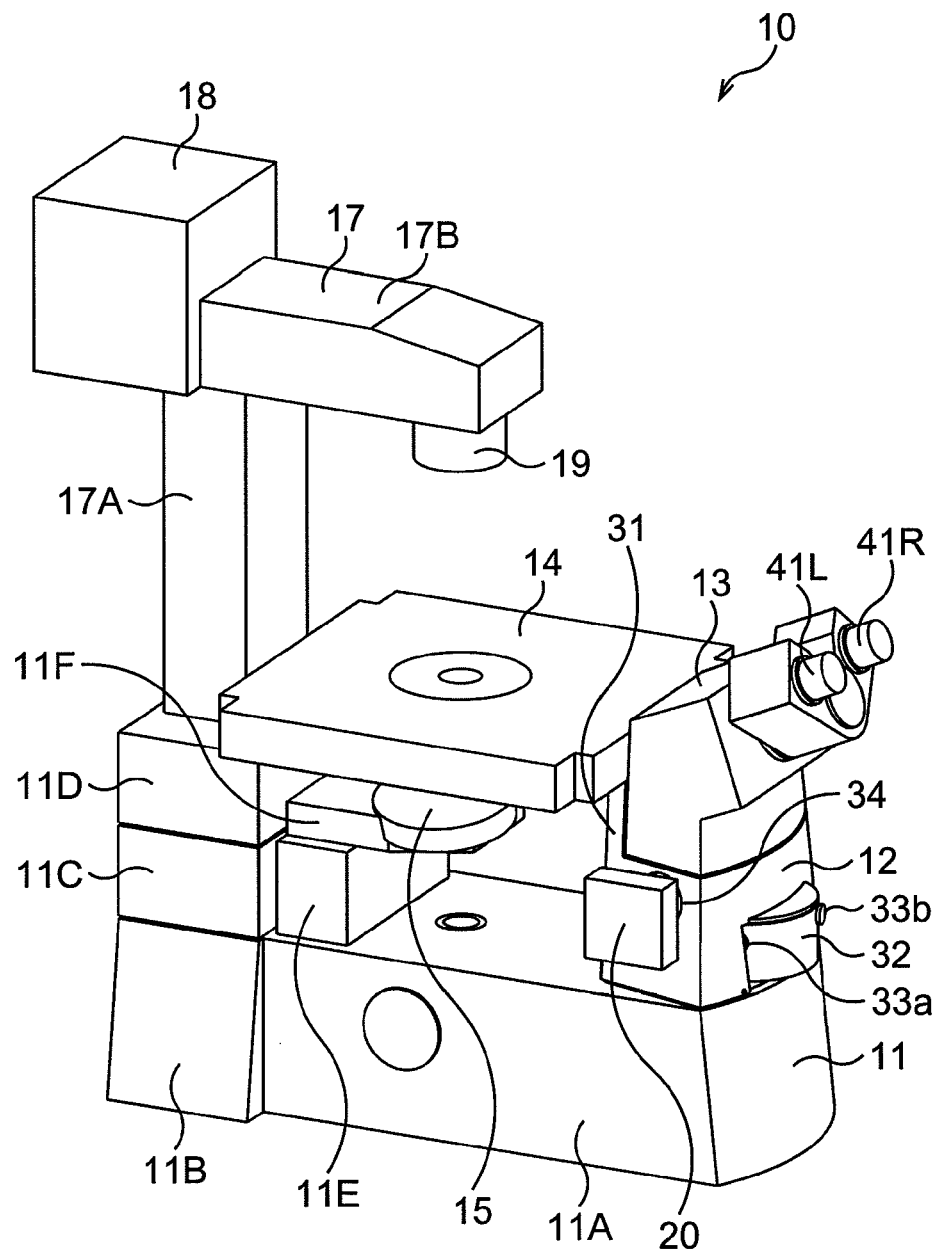
FIG. 1 is a perspective view depicting an embodiment of a microscope to which the present invention is applied.

EXPLANATION OF REFERENCE NUMERALS 10 microscope
11 main unit
12 eyepiece base unit
13 eyepiece tube
20 camera
31 eyepiece base unit body
31A aperture
32 turret
32A to 32C protrusions
32A' to 32C' aperture
32D aperture
33a to 33c operation axes
34 side port cylinder
35 base plate
35A concave portion
36 insertion/removal lever
61 base plate
61A aperture 62a to 62c support frames
63a to 63c metal frames
64a to 64c phase plates
65 reflecting mirror
66 imaging lens
67 central axis
68 plate spring
69L, 69R centering screws
101 reticle

BEST MODE FOR CARRYING OUT THE
INVENTION

Embodiments of the present invention will now be described with reference to the drawings.

Figure 2:
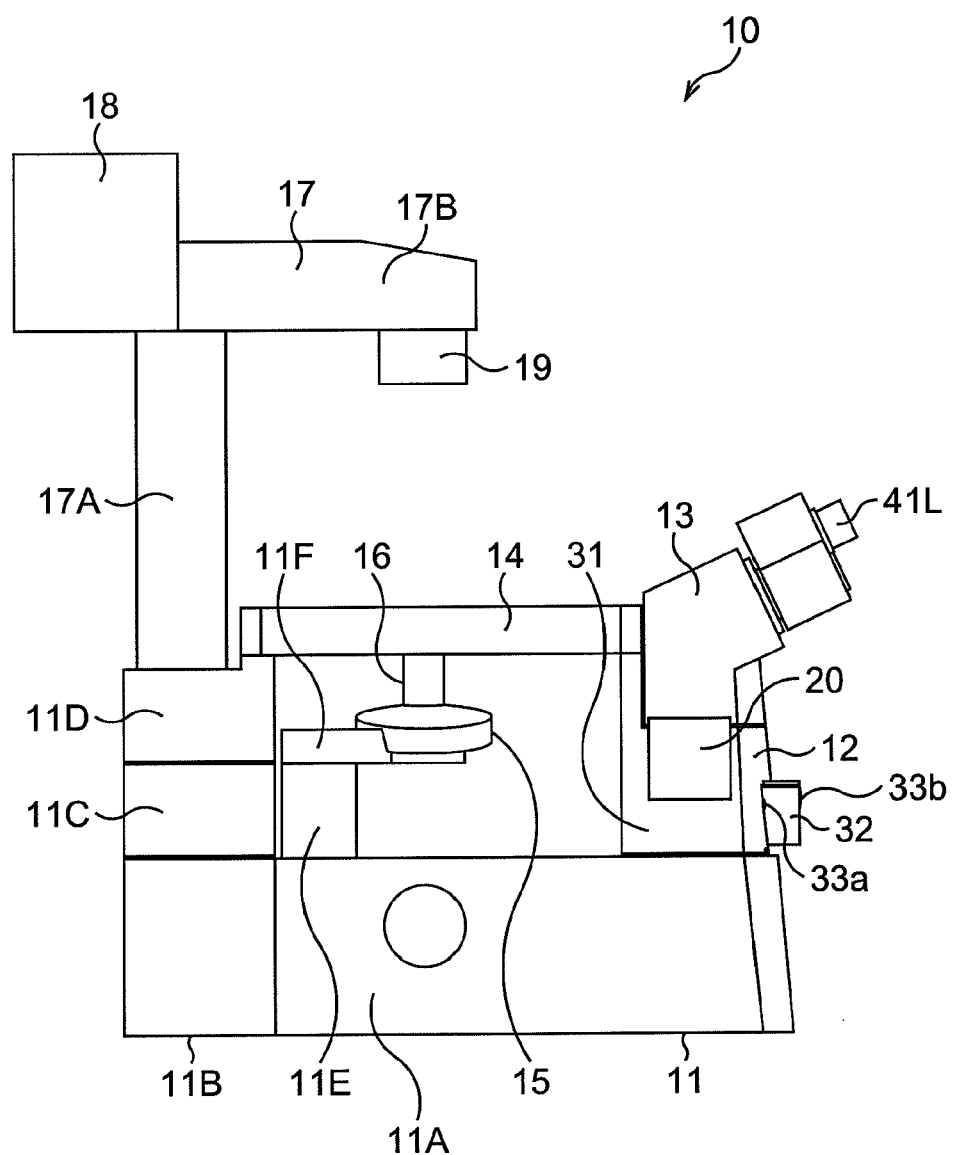
FIG. 2 is a side view depicting one embodiment of the microscope to which the present invention is applied.

FIG. 1 and FIG. 2 are external views of one embodiment of a microscope to which the present invention is applied. FIG. 1 is a perspective view of the microscope 10, and FIG. 2 is a side view of the microscope 10.

In the microscope 10, the side of the user looking into the microscope 10 via the eyepiece tube 13 when the microscope 10 is used (right side in FIG. 1 and FIG. 2) is called the "user side" herein below. Also in the microscope 10, it is assumed that the front direction is the user side, the rear direction is the opposite side of the user side, the left direction is the left side as the user faces the microscope 10, and the right direction is the right side as the user faces the microscope 10.

The main unit 11 is comprised of units 11A to 11F. An eyepiece base unit 12 is disposed in the front end of the top face of the unit 11A, and the unit 11E is disposed in the rear end thereof. The unit 11B is disposed on the rear side face of the unit 11A, in an integrated manner. Unit 11C is disposed on the top face of the unit 11B, and the unit 11D is disposed on the top face of unit 11C. In the unit 11C, an epi-illumination device is installed from the rear face of the microscope 10. Unit 11D connects a transmitted illumination device to the main body, and supports one side of a stage 14. An inverted L-shaped transmitted illumination post 17, consisting of a vertical post 17A and horizontal post 173, is disposed on the top face of the unit 11D.

Unit 11F is disposed on the top face of the unit 11E. Unit 11E is a component that moves vertically by a vertical motion mechanism. A revolver 15 is disposed on the front edge of the top face of the unit 11F. Unit 11F is a support base element of the revolver 15, and is a part of the revolver. Unit 11F has a lens that can move in the optical axis direction. Thereby the detection light can be adjusted and entered into the detection unit upon focusing within the sample.

The eyepiece base unit 12 is removably attached to the unit 11A of the main unit 11. In other words, the eyepiece base unit 12 can be attached to the main unit 11 or removed from the main unit 11. While details will be described later with reference to FIG. 3 to FIG. 7, the eyepiece base unit 12 is comprised of an eyepiece base unit body 31, turret 32, operation axes 33a, 33b and side port cylinder 34. A camera 20 is installed on the side port cylinder 34.

An eyepiece tube 13 as a lens barrel unit has a configuration that can be removably attached to the eyepiece base unit 12. In other words, the eyepiece tube 13 can be attached to the eyepiece base unit 12 or removed from the eyepiece base unit 12. The user can observe the sample that is set on a stage 14 via the oculars 41L and 41R installed on the eyepiece tube 13.

The stage 14 is supported by the front edge of the top face of the unit 11D and the top face of the eyepiece base unit 12, so as to be approximately in parallel with the bottom face of the microscope 10. The stage 14 can be moved fore and aft and left and right by a driving mechanism, which is not illustrated, so that the position of the sample on the stage 14 can be adjusted.

The revolver 15 is rotatably supported on the front edge of the top face of the unit 11F. The user can select one of the plurality of objective lenses installed in the revolver 15 to be used for observing the sample, by rotating the revolver 15 to the left or right. In FIG. 2, only one objective lens 16 is illustrated to simplify the drawing.

A transmitted illumination lamp 18 is disposed on the corner of the transmitted illumination support 17 (top face of the post 17A and rear face of the post 17B), and a condenser lens 19 is disposed at the tip of the bottom face of the post 17B of the transmitted illumination support 17 and above the stage 14.

In FIG. 1 and FIG. 2, the condenser lens 19 is shown in a simplified illustration. Actually, however, the condenser lens 19 is movably supported by a support element, which is not illustrated, in the optical axis direction (vertical direction in FIG. 1), for example, so that the position of the condenser lens 19 is adjusted in the optical axis direction. The optical elements, such as a ring diaphragm, can be switched using a turret, which is not illustrated, for example.

Now the function of the microscope 10, when the microscope 10 is used for the phase contrast observation, will be described in brief.

The transmitted illumination light emitted from the transmitted illumination lamp 18 passes through the ring diaphragm, which is not illustrated, and becomes parallel luminous flux by the condenser lens 19, and is irradiated onto the sample on the stage 14. The transmitted illumination light irradiated onto the sample is separated into direct light which linearly propagates inside the sample and diffracted light that is diffracted by a phase object included in the sample, and propagates in a diffracted direction. The diffracted light and direct light pass through the objective lens 16 respectively, and reach a phase plate (not illustrated in FIG. 1 and FIG. 2) which is installed in the eyepiece base unit 12 and is inserted into a pupil conjugate plane, that is a conjugate with the image side focal plane (pupil plane of the objective lens 16).

The phase plate is a ¼ wavelength plate for shifting the phase of the light by $\lambda/4$ ($\lambda$ is the wavelength of the transmitted illumination light) and an ND filter for absorbing light, which are formed in a ring shape, and the other portions of the phase plate are transparent. The direct light is condensed by the objective lens 16, passes through the portion on the ring of the phase plate, and brightness is decreased when the phase is shifted by $\lambda/4$. The diffracted light, on the other hand, largely passes through the transparent portion of the phase plate, and both phase and brightness hardly change. The direct light and diffracted light then reach the image plane, and can be observed via the oculars 41L and 41R or imaged by the camera 20, as an image having brightness contrast.

Figure 3:
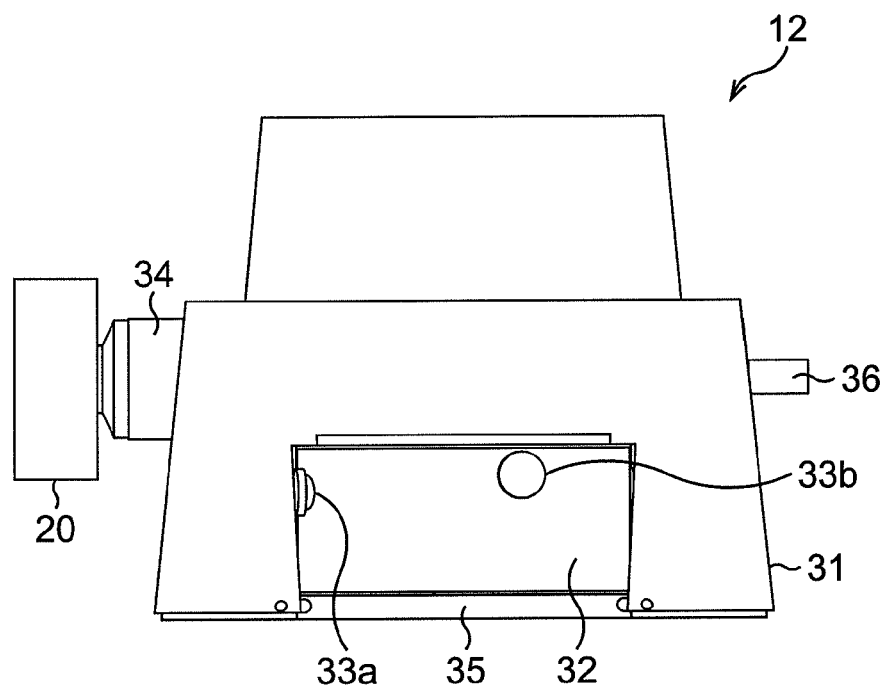
FIG. 3 is a front view depicting an embodiment of an eyepiece base unit to which the present invention is applied.
Figure 4:
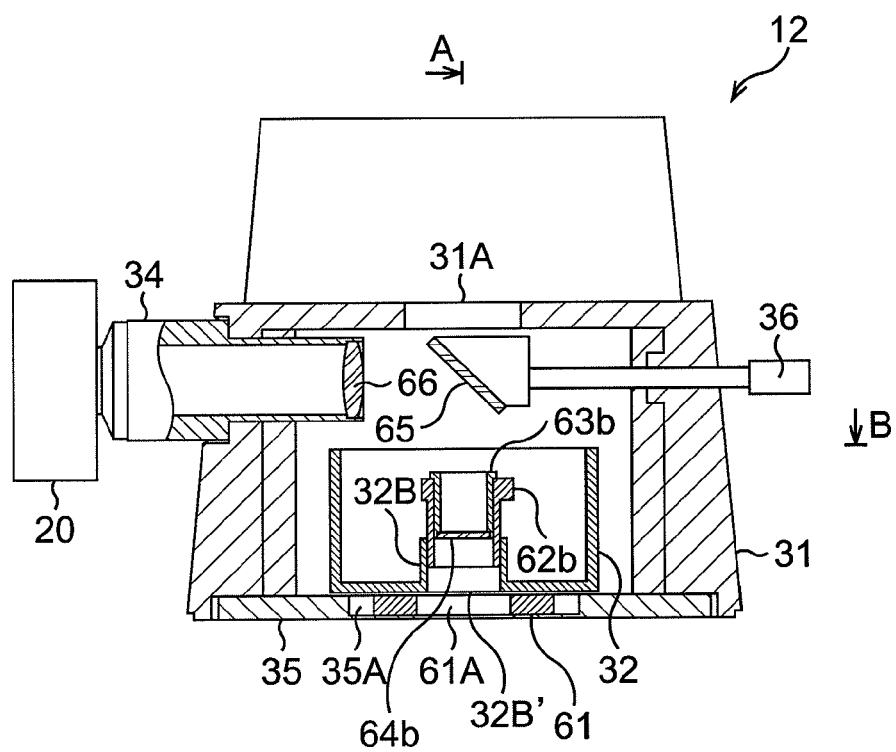
FIG. 4 is a cross-sectional view depicting one embodiment of the eyepiece base unit to which the present invention is applied.
Figure 5:
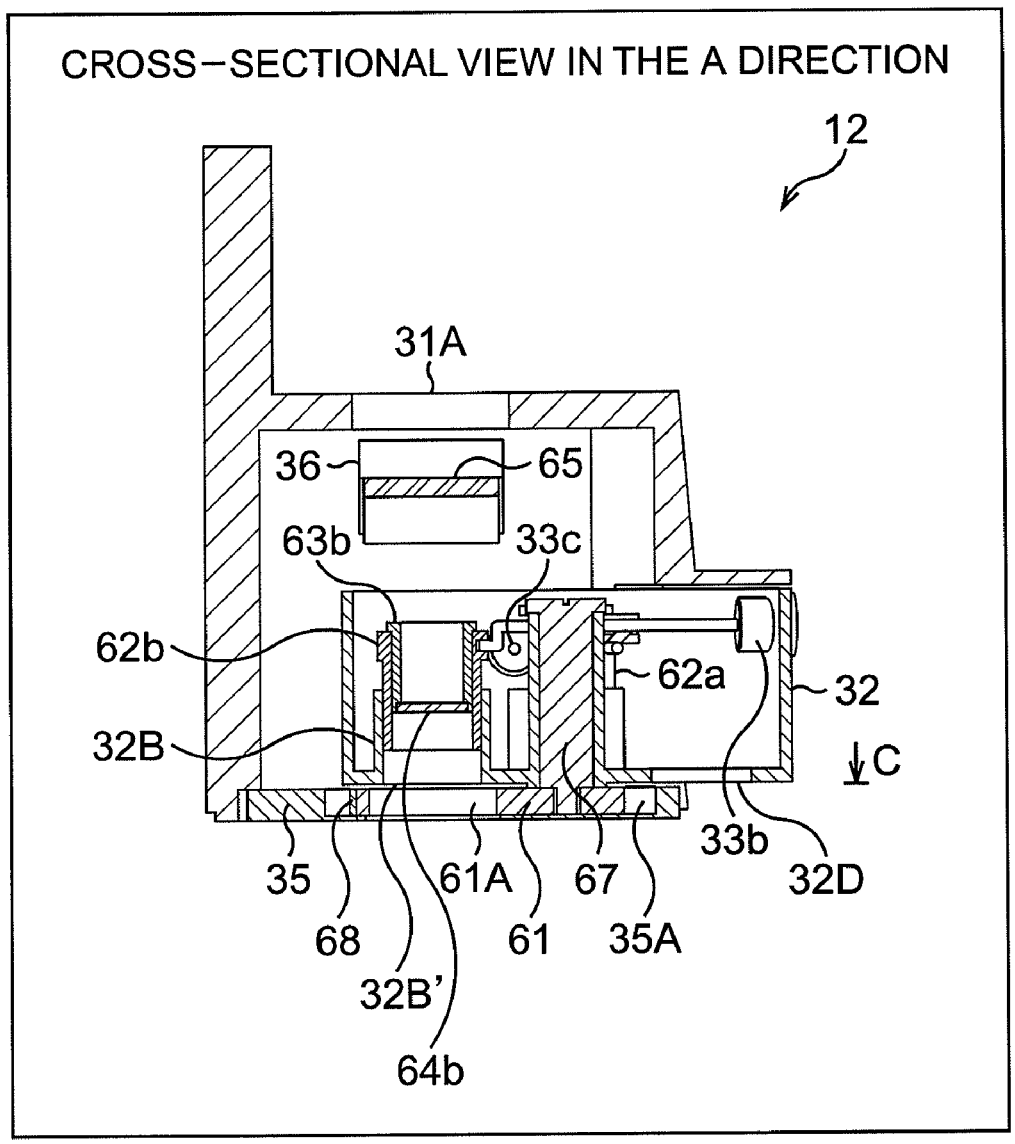
FIG. 5 is a cross-sectional view depicting one embodiment of the eyepiece base unit to which the present invention is applied (in the A direction)
Figure 6:
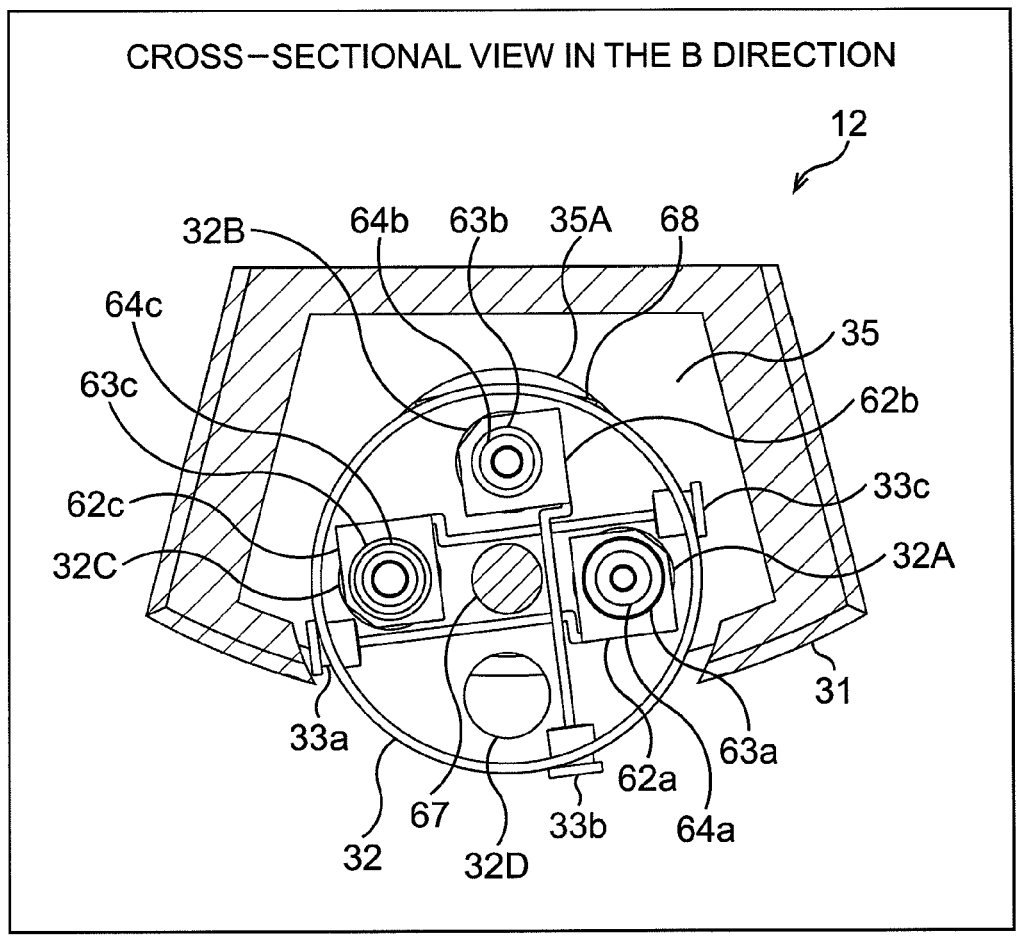
FIG. 6 is a cross-sectional view depicting one embodiment of the eyepiece base unit to which the present invention is applied (in the B direction)
Figure 7:
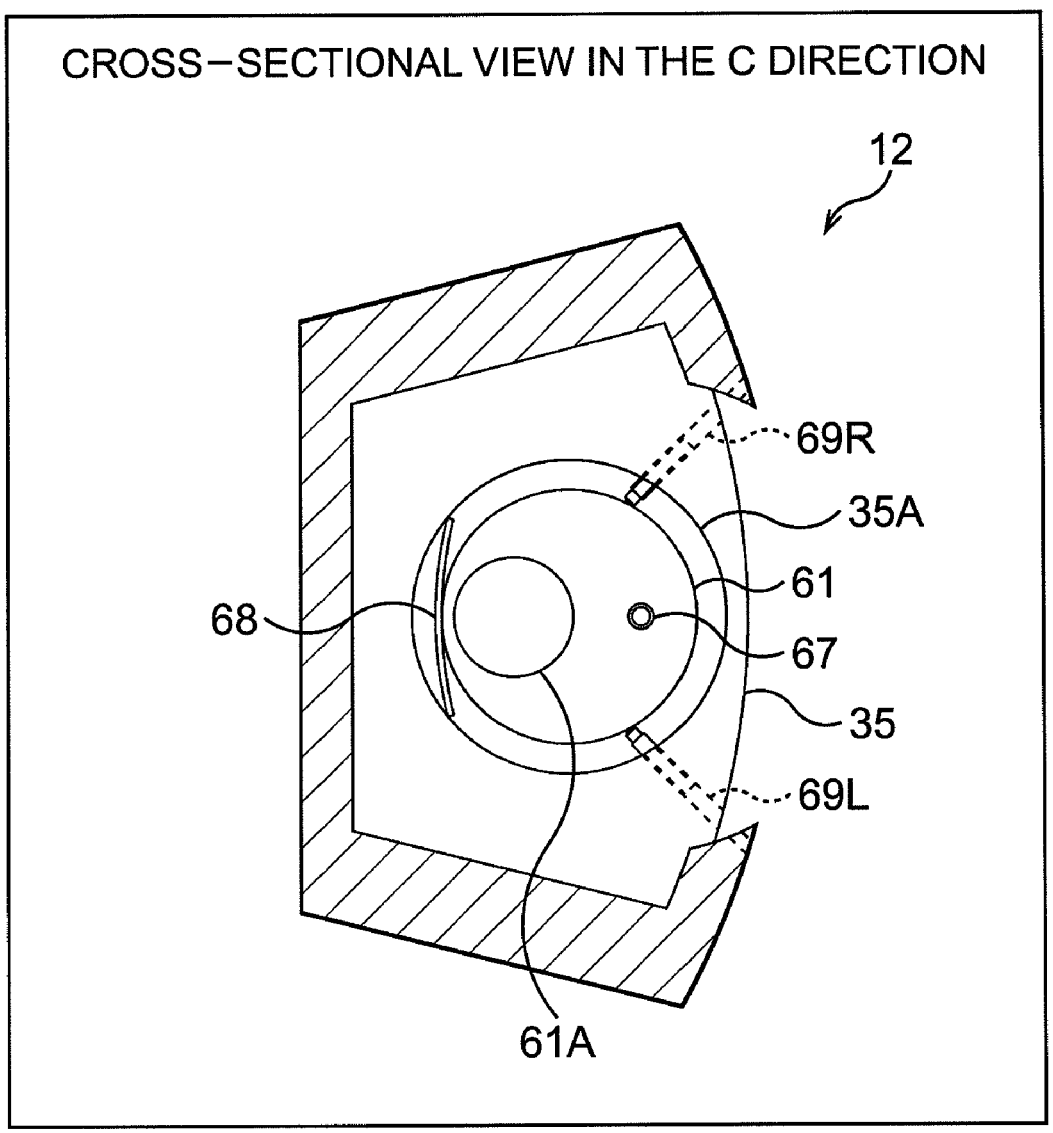
FIG. 7 is a cross-sectional view depicting one embodiment of the eyepiece base unit to which the present invention is applied (in the C direction)

FIG. 3 to FIG. 7 are diagrams depicting the configuration of the eyepiece base unit 12 in more detail. FIG. 3 is a front view of the eyepiece base unit 12, FIG. 4 is a cross-sectional view of the plane that includes the optical axis of the transmitted illumination light that passes through the eyepiece base unit 12, FIG. 5 is a cross-sectional view (in the A direction) of a plane that includes the optical axis of the transmitted illumination light that passes through the eyepiece base unit 12, FIG. 6 is a cross-sectional view (in the B direction) of the top face of the turret 32 of the eyepiece base unit 12, and FIG. 7 is a cross-sectional view (in the C direction) of the turret 32 installation plane of the eyepiece base unit 12.

First the configuration of a portion related to switching of the phase plate, centering and positional adjustment in the optical axis direction will be described.

The turret 32 is rotatably held onto the base plate 61 by the central axis 67, which is itself secured. The base plate 61 is disposed in a circular concave portion 35A of the base plate 35, and the position thereof in the horizontal direction is supported by a plate spring 68 and centering screws 69L and 69R. The base plate 35 is installed in the eyepiece base unit body 31 so that the position is secured.

Therefore the turret 32 can be rotated in the left and right directions with the center axis 67 as a center, and the position thereof is confirmed by a clicking mechanism, which is not illustrated. The horizontal position of the turret 32, which is installed on the base plate 61 via the central axis 67, can be adjusted by adjusting the tightening positions of the centering screws 69L and 69R, and moving the base plate 61 in the concave portion 35A.

In order to pass the transmitted illumination light that enters from the main unit 11 of the microscope 10, a circular aperture 61A is formed in the base plate 61, and an aperture of the base plate 35 is opened directly under the aperture 61A.

Cylindrical protrusions 32A and 32C are disposed on the bottom face of the turret 32, and apertures 32A' to 32C' are disposed inside the protrusions 32A to 32C. An aperture 32D is also disposed on the bottom face of the turret 32. The apertures 32A' to 32C' and the aperture 32D are disposed with approximately an equal interval on a same circumference with the central axis 67 as the center.

In the protrusions 32A to 32C, cylindrical support frames 62a to 62c are slideably inserted in the vertical direction. The crank-like tops of the operation axes 33a to 33c are fitted into the horizontal grooves formed in a part of the flanges at the top ends of the support frames 62a to 62c respectively. Therefore the support frames 62a to 62c can be vertically moved by rotating the operation axes 33a to 33c around the axes.

In the support frames 62a to 62c, the positions of the grooves for fitting the top face of each support frame and the operation axes 33a to 33c are set so that the vertical stoke range of the top face of each support frame become approximately the same. In other words, the top faces of the support frames 62a to 62c vertically move in approximately a same range by rotating the operation axes 33a to 33c.

Cylindrical metal frames 63a to 63c are inserted into the support frames 62a to 62c respectively, and the positions thereof are fixed by the flanges formed at the tops. The phase plates 64a to 64c are installed at the bottoms of the metal frames 63a to 63c respectively. The vertical stroke ranges of the phase plates 64a to 64c, due to the rotation of the operation axes 33a to 33c, are determined depending on the distance from the top ends of the metal frames 63a to 63c to the phase plates 64a to 64c respectively.

By this configuration, the turret 32 is rotated and the apertures (apertures 32A' to 32D) of the turret 32, to be positioned above (on the optical axis of the transmitted illumination light) of the aperture 61A of the base plate 61, can be switched, thereby it can be selected whether or not the phase plate is used, or a phase plate to be used for observation can be selected. By operating the operation axes 33a to 33c, the positions of the phase plates 64a to 64c in the optical axis direction can be individually adjusted to be disposed on the pupil conjugate plane of the objective lens 16 installed on the optical path. The phase plates 64a to 64c can be centered by adjusting the tightening positions of the centering screws 69L and 69R, so as to move the turret 32 in a direction perpendicular to the optical axis direction.

Now switching of the propagating direction of the transmitted illumination light and the configuration of the portion related to a side port cylinder 34 will be described.

An insertion/removal lever 36 is installed in the eyepiece base unit body 31 so as to be pushed in or pulled out in the left and right directions of the microscope 10 (left and right directions on the page face in FIG. 4). A reflecting mirror 65 is installed on the tip inside the eyepiece base unit 12 of the insertion/removal lever 36, so as to turn in the left direction and to be diagonally lowered to about 45°.

In the state where the insertion/removal lever 36 is pushed in completely, the reflecting mirror 65 is disposed on the optical axis of the light from the sample which enters from the main unit 11 (top and bottom direction on the page face in FIG. 4) (transmitted illumination light transmitted through the sample, or fluorescent emitted from the sample). In this case, the light from the sample transmits through the aperture of the base plate 35 and the aperture 61A of the base plate 61, then transmits through one of the phase plates 64a to 64c or the aperture 32D disposed in the turret 32, and is reflected by the reflecting mirror 65 in the direction of the imaging lens 66. The reflected light forms an image on the imaging plane of the camera 20 attached to the left edge of the side port cylinder 34 by the imaging lens 66, and the camera 20 captures this image.

If the insertion/removal lever 36 is pulled and the reflecting mirror 65 positions outside of the optical path of the light from the sample, then the light from the sample transmits through the aperture, which is not illustrated, of the base plate 35 and the aperture 61A of the base plate 61, and transmits through one of the phase plates 64a to 64c or the aperture 32D disposed on the turret 32, then transmits through the aperture 31A of the eyepiece base unit body 31, and enters the eyepiece tube 13. In this case, the user can observe the image of the sample via the oculars 41L and 41R of the eyepiece tube 13.

Figure 8:
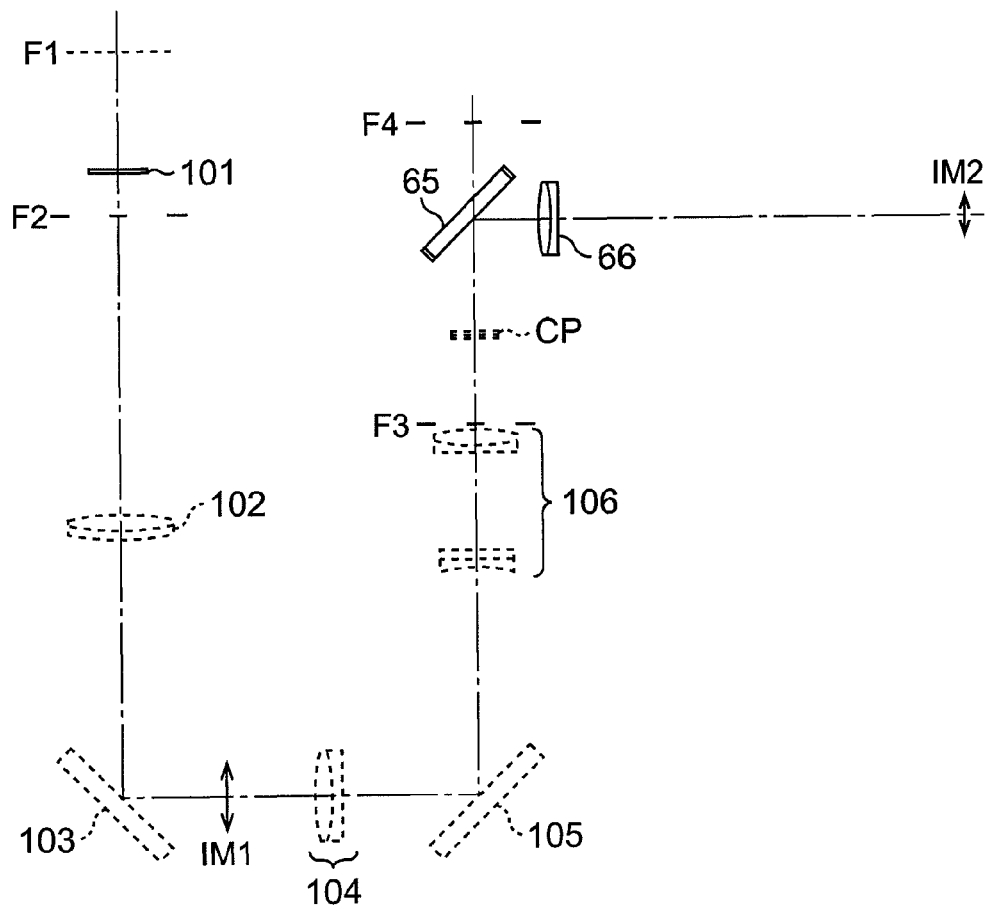
FIG. 8 is a diagram depicting an adjustment of phase plates.

Adjustment of the phase plates will now be described in detail with reference to FIG. 8 and FIG. 9. FIG. 8 is a diagram depicting an example of a configuration of the observation optical system of the microscope 10 when the phase plates are adjusted.

The function of the observation optical system of the microscope 10 will be described first.

Light from the sample, which is irradiated by the transmitted illumination light from the transmitted illumination lamp 18 (diffracted light and direct light), becomes parallel beams by an objective lens 16, which is not illustrated in FIG. 8, and forms an image on a primary image plane IM1 by a second objective lens 102. Before forming an image on the primary image plane IM1, the light from the sample is reflected by a reflecting mirror 103 in the direction to a field lens 104, which is used for establishing the conjugate relationship of the pupil plane and pupil conjugate plane CP. The light which formed an image on the primary image plane I1 transmits through the field lens 104, reflected by a reflecting mirror 105 in the direction of a relay lens 106, becomes parallel beams by the relay lens 106, and enters the pupil conjugate plane CP of the objective lens 16. The phase plates 64a to 64b installed in the turret 32 are inserted into this pupil conjugate plane CP, and the phase plate that is inserted into the pupil conjugate plane CP can be switched by rotating the turret 32.

The light which entered the pupil conjugate plane CP of the objective lens 16 is reflected by the reflecting mirror 65 in a direction of the imaging lens 66, and forms an image on the imaging plane IM2 of the camera 20 by the imaging lens 66.

As mentioned above, if the reflecting mirror 65 is removed from the optical axis, the light from the sample enters the eyepiece tube 13 and the image of the sample can be observed via the oculars 41L and 41R of the eyepiece tube 13.

In FIG. 8, the plane F1 indicates a sample plane, plane F2 indicates an end face of the objective lens 16, plane F3 indicates an end face of the eyepiece base unit 12, and plane F4 indicates an end face of the eyepiece tube 13. Therefore the eyepiece base unit 12 includes the pupil conjugate plane CP of the objective lens 16, reflecting mirror 65 and imaging lens 66. The main unit 11 includes a portion of the observation optical system of the microscope 10 on the sample side of the pupil conjugate plane CP, and the eyepiece tube 13 includes a portion of the observation optical system of the microscope 10 at the observation side (oculars 41L and 41R side) from the pupil conjugate plane CP.

Adjustment of the phase plates will be described next. To adjust the phase plates, a reticle 101 is attached to the revolver 15 of the microscope 10, instead of the objective lens 16.

Figure 9:
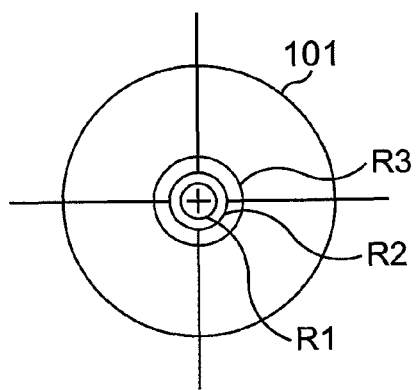
FIG. 9 is a diagram depicting an example of the phase plate.

FIG. 9 is a diagram depicting an example of the reticle 101. On the reticle 101, rings R1 to R3 are installed concentrically with the center of the reticle 101 as the center. The rings R1 to R3 correspond to the magnification of the objective lenses to be used respectively, and for example, the smallest ring R1 is used for centering when an objective lens of which magnification is ×100 is used, ring R2 is used for centering when an objective lens of which magnification is ×60 is used, and the largest ring R3 is used for centering when an objective lens of which magnification is ×40 is used.

The user rotates the turret 32 to select a phase plate corresponding to an objective lens having a largest NA (Numerical Aperture) and magnification, for example, and adjusts the tightening position of the centering screws 69L and 69R, so that the image of the ring of the selected phase plate overlaps with the ring of the reticle 101 that has the corresponding magnification. Thereby the entire turret 32 is centered. In this case, the accuracy of the centering of the other phase plates depends on the processing accuracy of the turret 32. Therefore if a fine adjustment is required in the centering of an individual phase plate, the fine adjustment is performed by centering of a ring diaphragm, which is not illustrated, at the condenser lens 19 side.

The eyepiece base unit 12 described above is a type that has an external phase contrast observation function and a side port cylinder 34 for the camera 20 (hereafter called the "side port/external phase contrast" type), but other types, such as a type that has only the side port cylinder 34 (hereafter called the "side port" type), and a type having neither the external phase contrast observation function and side port cylinder 34 (hereafter called the "basic" type), can also be installed.

If a plurality of types of eyepiece base units 12 can be installed in this way, a microscope having a function required by the user can be provided merely by replacing the eyepiece base unit 12 alone, without changing the configuration of the main unit 11 and the eyepiece tube 13, and flexibility improves. For example, it becomes possible that a microscope 10, where the basic type eyepiece base unit 12 is installed, is provided to a user who performs neither phase contrast observation and imaging of the sample, a microscope 10, where the side port type eyepiece base unit 12 is installed, is provided to a user who performs only photographing of the sample, and a microscope 10, where the side port/external phase contrast type eyepiece base unit 12 is installed, is provided to a user who performs both phase contrast observation and imaging of the sample.

If a user who once purchased a microscope 10 in which the basic type eyepiece base unit 12 is installed now must perform external phase contrast observation, the user can purchase only the side port/external phase contrast type eyepiece base unit 12 and attach it to the microscope 10 that they currently own, without purchasing a new phase contrast microscope. In other words, the phase contrast observation function can be easily added later to the microscope 10 which did not initially support phase contrast observation.

The eyepiece base unit 12 includes the pupil conjugate plane of the objective lens 16 in a state of being attached to the main unit 11 of the microscope 10, so by installing the new type of eyepiece base unit 12, a function to use an image of the pupil conjugate plane of the objective lens 16 (=pupil plane of the objective lens 16) can easily be added later to the microscope 10.

In the above description, an example of using the turret 32 as the mechanism for switching the phase plates was shown, but another mechanism, such as a slider, can also be used.

A beam splitter, instead of the reflecting mirror 65, may be installed at the tip of the insertion/removal lever 36, so as to insert or remove the transmitted illumination light into/from the optical path.

The reticle 101 in FIG. 9 may also be used as a reticle for centering of the epi-illumination device. In this case, it is preferable that a light reducing plate, such as an ND filter, is installed on the reticle 101, and the transmitted illumination light for phase contrast observation and epi-illumination light of the epi-illumination device during centering are adjusted in advance to be an appropriate brightness.

In the case of general microscope observation, where the sample is observed switching objective lenses having different magnifications, the position of the pupil conjugate plane in the optical axis direction changes if the type of the objective lens is different.

The position of the pupil conjugate plane in the optical axis direction also changes when some optical path element, such as a filter block having a dichroic mirror, or a barrier filter, is inserted into/removed from the optical path.

In the case of the configuration of the prior art, the shift of the pupil conjugate plane in the optical axis direction due to the change of observation conditions cannot be supported, and an optimum phase contrast observation cannot be performed. However if the position of the phase plate in the optical axis direction can be changed freely, as described in the present embodiment, the phase plate can be disposed in an optimum position corresponding to the change of light even if observation conditions change, so a phase contrast observation matching the observation conditions can be possible.

There are three types of eyepiece base units 12: a type for contrast variable phase contrast observation, a type for Hilbert differential contrast observation, and a type for Hofmann modulation contrast observation, and the user can switch between these three types of units.

In any case, a relay optical system is disposed between the eyepiece base unit 12 and an objective lens being set, and the pupil conjugate plane (external pupil) of the objective lens is generated by this relay optical system.

[Contrast Variable Phase Contrast Observation]

A microscope optical system for contrast variable phase contrast observation will be described first.

In the case of contrast variable phase contrast observation, the diaphragm disposed in the condenser lens 19 is set to the phase ring diaphragm, and the eyepiece base unit for contrast variable phase contrast observation is set for the eyepiece base unit 12.

The light emitted from the light source of the transmitted illumination lamp 18 passes through one of an ND filter for limiting light quantity, an NCB filter for controlling color temperature, and an interference filter for limiting wavelength via a collector lens and relay lens, which are not illustrated, and enters the objective lens being set via the sample.

The phase ring diaphragm disposed in the condenser lens 19 is disposed near the pupil position of the condenser lens 19.

A polarizing element a, a ¼ wavelength plate, a phase contrasting element, a polarizing element b and a depolarizer are disposed in order of the entry of light inside an eyepiece base unit 12. Of these, the reference plane of the phase contrast element (plane on which the phase film is formed) is disposed near the external pupil, and the depolarizer and polarizing element b are integrated.

The polarizing element a can be rotated around the optical axis of the microscope 10. The polarizing element a is attached to the slider, and in this slider, a hollow portion is also formed along with the polarizing element a.

The ¼ wavelength plate is attached to the slider, and in this slider a hollow portion is also formed along with the ¼ wavelength plate.

The phase contrast element can position the element center thereof with respect to the optical axis of the microscope 10 (centering adjustment), and can move in the optical axis direction. The phase contrast element is attached to the turret along with other types of phase contrast elements, and in this turret, a hollow portion is also formed along with the plurality of types of phase contrast elements.

There are three types of phase contrast elements to be attached to the turret, for example. These phase contrast elements are selectively used according to the magnification and numerical aperture of the objective lens being set. It is assumed that the switching accuracy of the turret is sufficiently high, and the centering of individual phase contrast elements attached to the turret is adjusted when the center of the turret and the optical axis of the microscope 10 are aligned.

The polarizing element b and the depolarizer can be rotated around the optical axis of the microscope 10. The polarizing element b and the depolarizer are attached to the slider, and in this slider a hollow portion is formed along with the polarizing element b and the depolarizer.

The phase ring diaphragm has a same shape as the phase ring diaphragm used for the phase contrast microscope, and a ring shaped aperture, of which center is the optical axis, is formed on a thin light shielding plate.

The direction of the ¼ wavelength plate is set in a predetermined direction.

The phase contrast element is comprised of two types of polarizing films of which direction is perpendicular to each other. Photonic crystal is a product example thereof. If structural double refraction crystal is used for each of the two types of polarizing films, however, the polarizing element is not a linearly polarizing type, but is a circularly polarizing type, and the ¼ wavelength plate is omitted.

[Hilbert Differential Contrast Observation]

A microscope optical system for Hilbert differential contrast observation will be described next.

Upon Hilbert differential contrast observation, the diaphragm of the condenser lens 19 is set to the differential phase contrast diaphragm, and the eyepiece base unit for Hilbert differential contrast observation is set for the eyepiece base unit 12.

A differential phase contrast element is disposed inside the eyepiece base unit. The reference plane of this differential phase contrast element is located near the external pupil. The differential phase contrast element can rotate around the optical axis of the microscope 10, and centering thereof with respect to the optical axis of the microscope 10 can be adjusted, and can move in the optical axis direction. The differential phase contrast element is attached to the turret with other types of differential phase contrast elements, and in this turret, a hollow portion is also formed along with the plurality of types of differential phase contrast elements.

There are three types of differential phase contrast elements to be attached to the turret, for example. These differential phase contrast elements are selectively used according to the magnification and numerical aperture of the objective lens being set.

In this way, the optical elements related to Hilbert differential contrast observation are the differential phase contrast diaphragm and the differential phase contrast elements.

[Hofmann Modulation Contrast Observation]

Finally a microscope optical system for Hofmann modulation contrast observation will be described.

Upon Hofmann modulation contrast observation, an eyepiece base unit for Hofmann modulation contrast observation is set for the eyepiece base unit 12.

A modulator is disposed inside the eyepiece base unit. The reference plane of this modulator is located near the external pupil. The modulator can rotate around the optical axis of the microscope 10, and centering thereof with respect to the optical axis of the microscope 10 can be adjusted, and can move in the optical axis direction.

The modulator is attached to the turret with other types of modulators, and in this turret, a hollow portion is also formed along with the plurality of modulators.

There are three types of modulators to be attached to the turret, for example. These modulators are selectively used according to the magnification and numerical aperture of the objective lens being set.

It is assumed that the switching accuracy of the turret is sufficiently high, and centering of an individual modulator attached to the turret is adjusted by aligning the center of the turret and the optical axis of the microscope 10.

The optical elements related to the Hofmann modulation contrast observation are the MC rectangular diaphragm and modulator.

The MC rectangular diaphragm is a rectangular aperture having a shorter side in the diameter direction, which is formed in a position away from the optical axis on the thin light shielding plate, and in which about half of the rectangular area in the optical side of the rectangular aperture is covered with the polarizing plate. As a result, the rectangular polarization area and the rectangular aperture are formed in the MC rectangular diaphragm, so as to change the contrast of the image of the sample.

The modulator consists of a low transmittance area, intermediate transmittance area and high transmittance area of which transmittances differ from each other, so that the image of the sample has a shadow in the direction perpendicular to the border lines, which allows three-dimensional observation.

Embodiments of the present invention are not limited to the above mentioned embodiments, but can be modified in various ways without departing from the scope and spirit of the invention.

The invention claimed is:

1. An inverted microscope that can perform phase contrast observation, comprising:
   an objective lens;
   an eyepiece tube;
   a main unit that includes a portion of an observation optical system between the objective lens and the eyepiece tube; and;

a first eyepiece base unit that houses a phase plate for phase contrast observation and that can be removably attached to the main unit so as to be replaceable with a second eyepiece base unit housing another optical device for performing observation other than phase contrast observation, the first eyepiece base unit in a state of being attached to the main unit being configured to be able to install at a position conjugate with a pupil of the objective lens, wherein the eyepiece tube can be removably attached to the first eyepiece base unit and the second eyepiece base unit;

the first eyepiece base unit further comprises an eyepiece base unit body;

the phase plate is housed in the eyepiece base unit body; and a side port cylinder for installing a camera for imaging the observation sample is attached to the eyepiece base unit body.

* * * * *